March 12, 1968  G. F. BRINKMAN ETAL  3,372,634
COFFEE MAKERS
Filed April 6, 1964
3 Sheets-Sheet 1
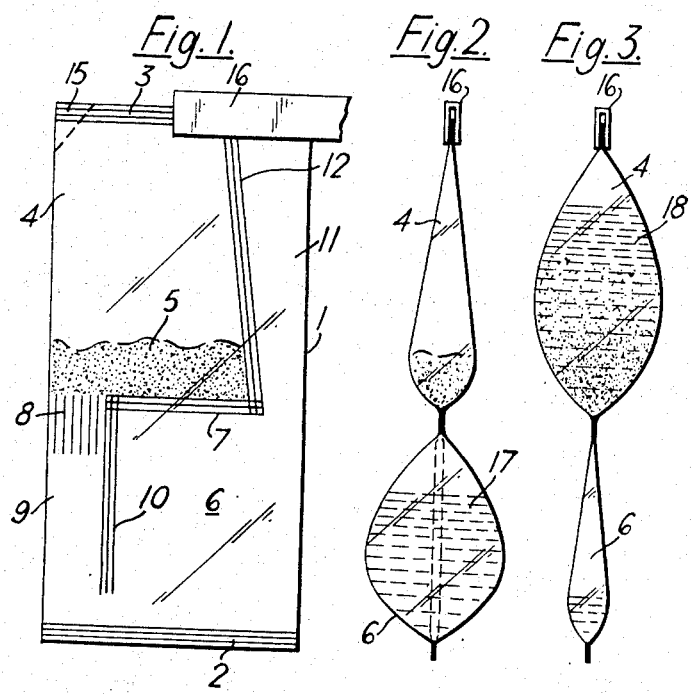
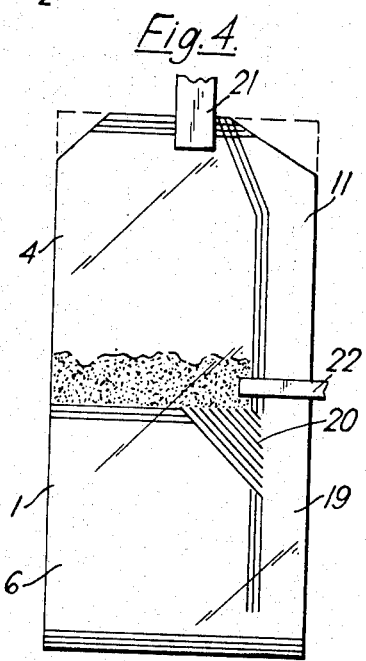

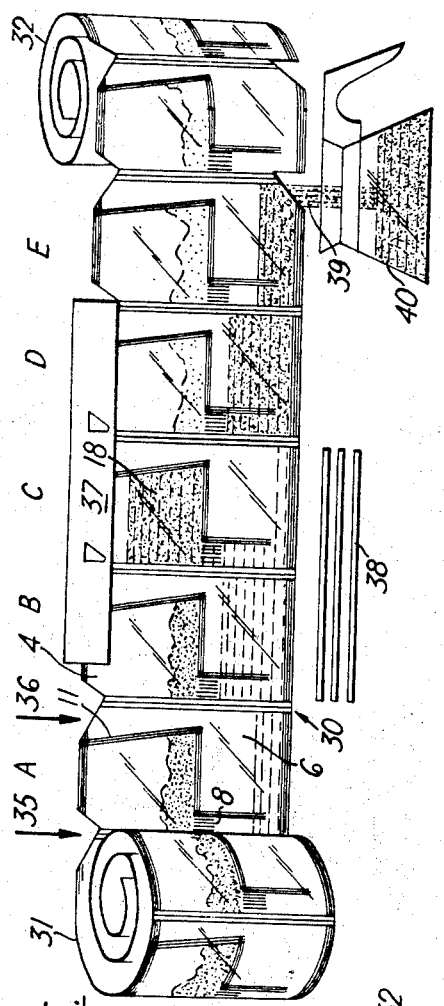
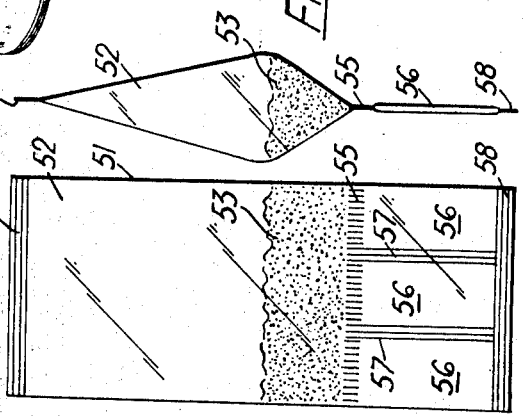

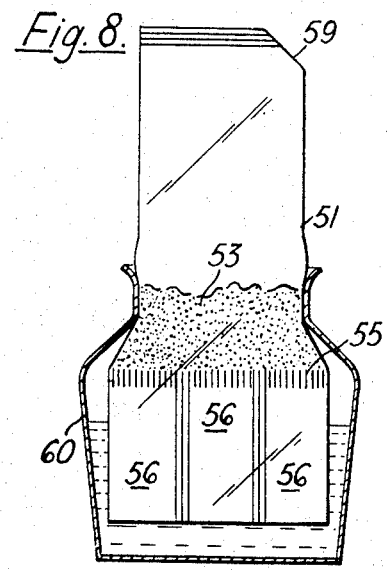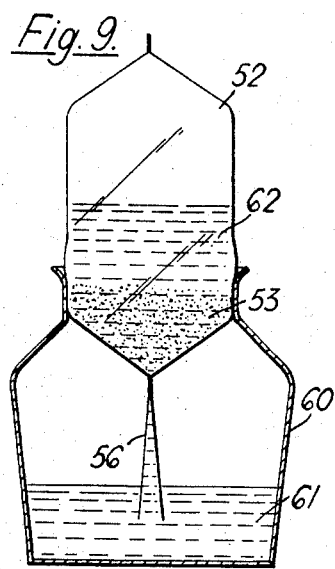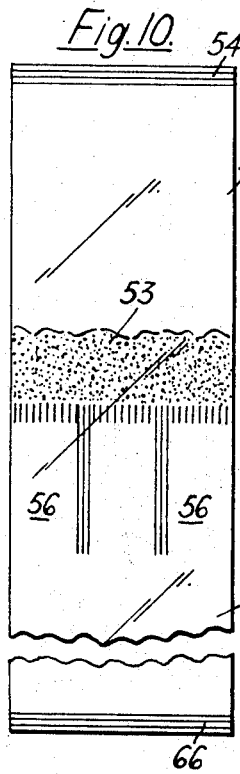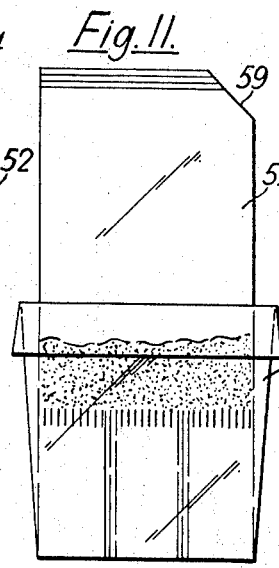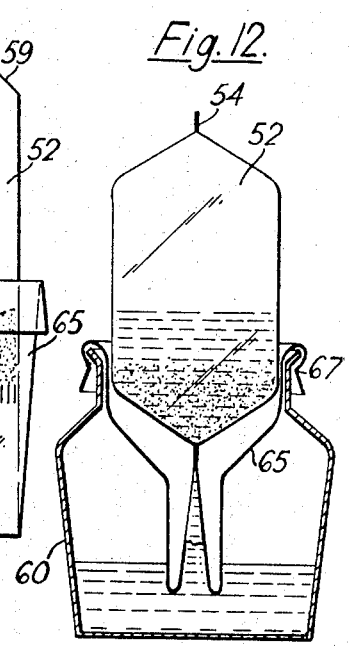

United States Patent Office 3,372,634
Patented Mar. 12, 1968

3,372,634
COFFEE MAKERS
Georges Frank Brinkman, Tadworth, and Abram Games, London, England, assignors of one-half to Cona, Limited, London, England
Filed Apr. 6, 1964, Ser. No. 357,671
Claims priority, application Great Britain, Apr. 10, 1963, 14,375/63
15 Claims. (Cl. 99—292)

ABSTRACT OF THE DISCLOSURE

A device for the preparation of vacuum infused or percolated liquid coffee from ground coffee in the form of a pack having walls of flexible heat-resisting material and divided into an upper and lower compartment. Filter means separate the compartments and conduit means extend from the lower part of the lower compartment into the upper compartment. In one arrangement the device is self-contained and a quantity of ground coffee is packed into the upper compartment and an appropriate quantity of water is inserted into the lower compartment. The pack is subsequently placed adjacent a heat source to heat the water which eventually moves up the conduit means into the upper compartment. Depending on the arrangement of the filter means and the conduit means, either vacuum infused or percolated coffee flows into the lower compartment from which it is subsequently removed. In another arrangement the lower compartment forms a tube connecting the upper compartment to water in a separate container.

---

In a coffee percolator steam pressure forces hot water upwardly through a hollow stem from a lower container into an upper container for ground coffee. The water then flows downwardly through a filter or strainer and returns to the lower container, the process repeating itself until the coffee is sufficiently infused. In another well known form of coffee maker the operating principle is similar but the hollow stem enters the bottom of the upper container and the filter is included in the stem or rests on its mouth. When boiling water is forced into the upper container by pressure via the stem, the ground coffee there is infused as long as heat is applied to the lower container. When heat is removed, a partial vacuum forms in the lower container and the infused coffee returns through the filter into it. In a simpler form of device boiling water is poured onto the ground coffee in an upper container or upper half of a single container and the infused coffee passes downwardly through a filter into the lower container or lower half.

These and other forms of coffee maker of which the essential components are either one or two containers and a filter or strainer, are commonly made of glass, ceramics, metal or earthenware or have components of these materials. They are normally rigid in structure and tend to be bulky, fragile and require constant cleaning or replacements. They cannot be easily transported and are unsuitable for travel, outdoor picnic use and so forth.

According to the present invention a coffee making device of the general kind just described comprises a sealed pack of heat-resistant material part of which encloses a quantity of ground coffee and the device also includes a filter for the infused coffee. In addition the walls of the pack may also define a tube or tubes leading from the filter away from the part of the pack enclosing the ground coffee. Such a device may be used in conjunction with a separate lower container or the pack itself may include two compartments connected together by way of the filter, the upper of these compartments containing the ground coffee and the lower serving the same purpose as the separate container.

In a simple form the invention comprises a sealed pack containing coffee, a filter and a tube leading from the filter to water in a separate container below the pack. In this form the pack may be rested on top of the separate lower container which is heated so that steam pressure in the container forces water up the tube and into the pack where the coffee is infused and after removal of the heat is allowed to pass back through the filter and the tube into the lower container. In another form the device may include two separate compartments wherein the lower compartment needs first to be filled with water which as the result of subsequent heating is forced up the tube into the upper compartment to infuse the coffee which is then allowed to return through the filter and back into the first compartment from which it can be poured.

As stated above the pack must be of heat-resisting material and may, for example, consist of flexible plastics or foil or laminates or combinations of the two. Generally speaking it is only necessary that the material should be able to withstand the temperature of boiling water. It may be necessary to heat the device over a flame but provided the flame is only applied while the device is filled with water it is not found to be necessary for the material to be flameproof. In particular plastics such as nylon, Mylar (registered trademark) high density polythene, polypropylene and metal foils such as aluminium foil are found to be suitable for the purpose.

The heating source may be constituted by a heating jacket operated electrically or otherwise, or by boiling water or other liquid having a sufficiently high boiling point, or by hot air. It is also possible to heat the device directly over a hot point or electrical element or a small flame, for example of a spirit lamp, provided that the surfaces exposed to the flame are covered by liquid on the inside and free edges resulting from seams are removed from direct contact with the flame. When made from plastic the device may conveniently be fabricated from lay-flat tubing, the compartments being separated from one another by seams between opposite walls. The filter may also be defined by a pattern of seams or seals or alternatively it may be a separate part which is held in position by means of seams between opposite sides of the pack. Yet again the pack may be made of roughened or embossed material and the opposite surfaces held together in the region of the filter to leave narrow filtering passages between them.

Prior to filling with water the assembly is almost completely flat and may easily be folded and packed. There is no danger of breakage and the device may be used with considerable saving of space, weight, handling and cleaning time and offers other advantages of general convenience over a normal coffee maker. Ground coffee is commonly sold in sealed plastic packs and a device in accordance with the invention which already contains prepacked coffee may thus be sold in place of the normal packs of coffee. In use it is only necessary to add hot water (and in most cases to heat it further) to make the coffee, after which the device with the used coffee it contains may be thrown away. Different sizes of device may be made according to the quantity of coffee required.

As mentioned above the device may be made with two compartments in which case it is completely self-contained or alternatively with only a single compartment in which case it would include a tube for passage of water between the filter and a separate lower container. In the embodiment with the tube, if the device operates by forcing the water upwardly to infuse the coffee and then maintaining the hot water in contact with the coffee until the heat is removed, it is important that the device should be a close fit with the separate container. With this embodiment, during the initial stages of operation steam passes upwardly along the tube and causes the ground coffee to swell, thus distending the device and forming a seal with the wall of the container. In order to obtain an improved seal the tube may form the central part of an elongated skirt portion of the pack which is capable of being folded back on itself in any of a number of ways. For example, this folded-back portion may extend outside the rim of the container and by folding it downwardly outside the container an efficient seal is obtained. This may be augmented by use of a sealing band or ring.

Constructions is accordance with the invention will now be described with reference to the accompanying drawings in which:

FIGURE 1 is a front view of one construction of device held in the vertical operating position;

FIGURES 2 and 3 are side views of the device of FIGURE 1 seen at successive stages in the operation;

FIGURE 4 is a view corresponding to FIGURE 1 of a slightly modified form of device;

FIGURE 5 is a view of equipment comprising a strip made up of devices as shown in FIGURE 1;

FIGURE 6 is a front view of another form of device;

FIGURE 7 is a side view of the device of FIGURE 6;

FIGURES 8 and 9 are a front view and side view respectively of the device of FIGURES 6 and 7 supported in a container;

FIGURE 10 shows a modified form of the device of FIGURE 6;

FIGURE 11 shows the device of FIGURE 10 folded ready for use; and

FIGURE 12 shows the devices of FIGURES 10 and 11 supported by a container.

Turning first to FIGURE 1 the device comprises a rectangular pack 1 which may be formed, for example, from plastic lay-flat tubing or from aluminum foil. It is formed with a transverse seal at the bottom at 2 and at the top at 3. The interior of the pack is divided into an upper compartment 4 containing ground coffee 5 and a lower compartment 6. The two compartments are separated primarily by a seam 7 between the opposite faces of the pack and also by a filter 8 defined between a number of closely spaced vertical seams or seals. A tube 9 extends downwardly from the holder 8 to a point close to the bottom of the lower compartment 6 and this tube is defined between one edge of the pack 1 and a seam or seal 10. A second tube 11 similarly defined between one edge of the pack 1 and a seam 12 extends from the top of the lower compartment 6 to the top of the upper compartment 4.

Originally the pack is completely sealed so that the enclosed coffee is maintained in a fresh condition. When the device is to be used for making coffee the top left-hand corner of the pack is cut off at 15 and the top right-hand corner (not seen in the drawings) is similarly cut off. Boiling water may then be poured down the tube 11 into the lower compartment 6, after which the top of the tube 11 is closed by means of a clamp 16 which also serves as a support for the complete device which is then placed over a source of heat. FIGURE 2 shows the start of the operation with the lower compartment 6 filled with water shown as 17. The effect of heat is to cause the water to be forced upwardly along the tube 9, through the filter 8 and coffee 5 into the upper compartment 4, where it dis-places air outwardly through the cut off corner 15. This stage is shown in FIGURE 3 where the infused coffee in the upper compartment 4 is shown as 18. When the coffee is sufficiently infused the source of heat is removed, and the infused coffee returns downwardly through the filter 8 into the lower compartment 6, leaving the used coffee grounds 5 in the upper compartment. The coffee may then be poured out through the tube 11 after removal of the clamp 16 and the pack itself together with the used coffee may then be thrown away.

In the modified construction of FIGURE 4 the arrangement of compartments is the same but the tube 9 is formed on the right, being shown as 19, so that the tube 11 forms an extension of it. The filter is also situated at the right and is shown as 20. In use the device is supported by a clamp 21 and in addition a further clip 22 needs to be applied as shown so that water is forced up the tube 19 and through the filter 20, being prevented from passing up and tube 11 by the clip 22. Apart from this the operation and use of the device are the same as already described.

In the arrangement of FIGURE 5 a number of packs as shown in FIGURE 1 are joined side by side to constitute a strip indicated generally as 30. This is drawn from a supply reel 31 and after use is re-reeled at 32. Between these two reels the strip extends with the packs in a vertical position in which they are moved step by step through successive operating positions. The first of these positions is shown as A and in this position the left-hand corner of one pack and the right-hand corner of the next pack are removed simultaneously as indicated at 35. While in this position hot water is poured into the right-hand corner of one pack as shown at 36, passing down the tube 11 into the lower compartment 6. When the filling is complete the strip is advanced one step and the pack already filled passes to the position B. Here the top passes into contact with a member 37 which acts as a guide and as a clamp, serving the same function as the clamp 16 of FIGURE 1. In position B the pack is over a source of heat 38 and the water is forced into the upper compartment 4 in the manner already described. To allow sufficient time for infusion of the coffee the heating is continued when the pack moves to the position C where the infused coffee is shown in the upper compartment at 18. At the next step of movement the pack moves into the position D where it is still guided by the member 37 and the infused coffee flows downwardly through the filter 8. In the final position E the bottom right-hand corner of the pack is cut off at 39 and the coffee flows out into a jug or other receptacle 40. The spent pack is then wound up on the reel 32. When the complete strip has been wound onto the reel 32 it may then be discarded.

The arrangement shown in FIGURE 5 is of particular advantage for use in cafes, hotels and other forms of mass catering where coffee is required quickly and in quantity. This arrangement offers great advantages from the point of view of cleaning, breakage, handling, pouring and disposal of waste and coffee grounds. As an alternative to winding the strip onto reels it can be folded in zig-zag or concertina fashion.

The forms of device shown in the remaining figures are all intended for use with a separate lower container. Turning first to FIGURE 6 the pack as a whole is shown as 51 and comprises an upper compartment 52 containing coffee 53 maintained in a state of freshness by a seal 54. The bottom of the compartment 52 is defined by a filter 55 beneath which extend three tubes 56 separated from one another by seams 57. The bottom is closed by a further seal 58 so as to maintain the sealing of the pack as a whole. The pack is seen in side view in FIGURE 7. In use the top right-hand corner is cut off at 59 and the lower seal 58 is removed to leave the bottoms of the tubes 56 open. The device as a whole is then supported in the neck of a container 60 containing the required amount of hot water. When the water is heated the steam passing up through the tubes 56 distends the coffee 53 and causes the pack to make an effective seal with the neck of the container 60 as seen in FIGURE 9. Consequently the steam pressure forces the water shown as 61 upwardly into the compartment 52 to infuse the coffee 62. When the source of heat is removed the infused coffee 62 returns through the filter 65 into the container 60, after which the pack 51 may be thrown away and the coffee poured out from the container.

The construction of FIGURES 10 to 12 is slightly modified in that an elongated skirt portion 65 extends below the tubes 56 and terminates in a seal 66 similar to the seal 58. In use the seal 66 is first removed and the skirt 65 is folded back on itself as far as the ends of the tubes 56 as seen in FIGURE 11. When inserted in the container 60 the ends of the skirt 65 extend around the neck of the container as seen at 67 and thus form a seal which can be augmented if necessary by fitting a retaining ring round the neck (not shown). The right-hand corner is again cut off as seen at 59 and the operation proceeds in exactly the same manner as described in connection with FIGURES 6 to 9.

It will be seen from the foregoing that a variety of forms of coffee making device may be constructed in the form of a self-contained pack which includes the ground coffee and also a filter.

Yet again the device may be constructed so as to operate after the manner of a coffee percolator. In this event the device of FIGURES 1 or 4 may be modified by causing the tube 9 or 19 to extend towards the top of the upper compartment where it may be left open after filling with water. The hot water passes up the tube and enters the top of the upper compartment which may be sub-divided by horizontal seams, which between them define an elongated path, so that the hot water is caused to flow downwardly through all the ground coffee. In addition the filter may be caused to extend across substantially the whole of the boundary between the two compartments. By maintaining the heat the water is caused to circulate for any required length of time until the coffee is completely infused.

We claim:

1. A coffee-making device comprising a container having an upper compartment capable of holding a quantity of ground coffee and a lower compartment formed as an extension of the walls of the upper compartment, said walls being formed of flexible heat-resisting material; means located between said walls for defining a conduit extending from a lower part of said lower compartment into said upper compartment so that heated water can pass through the lower compartment and through the conduit to said upper compartment; and filter means located between said walls for interconnecting said compartments to filter liquid coffee which flows from said upper compartment to said lower compartment.

2. A coffee-making device as claimed in claim 1 wherein the device is constructed to be used in conjunction with a separate container having a quantity of water therein, the said lower compartment forming a tube extending from said upper compartment to a level below the surface of the liquid in the second container, and wherein the device includes seal means for sealing the interior of the said separate container.

3. A device according to claim 2 in which the tube extends to a point close to the edge of the second compartment remote from the filter.

4. A device according to claim 3 in which the tube is defined by seams connecting opposite walls of the lower compartment.

5. A device according to claim 2, in which the end of the tube remote from the filter is formed with a seal capable of ready removal.

6. A device according to claim 5, in which the tube forms the central part of an elongated skirt portion capable of being folded back to form the said seal means with the said separate container.

7. A coffee-making device constructed to be self-contained for preparing coffee comprising a container divided into an upper compartment capable of holding a quantity of ground coffee and a lower compartment capable of holding a quantity of liquid and having walls of flexible heat-resisting material; means located between said walls for defining a conduit extending from a lower part of said lower compartment into said upper compartment through which heated water can pass from said lower compartment to said upper compartment; and filter means located in said conduit for filtering liquid coffee which flows from said upper compartment to said lower compartment, whereby when ground coffee is placed in the upper compartment and water in the lower compartment, the device is operable to form a quantity of coffee in the lower compartment with only the application of an external heat source.

8. A coffee-making device according to claim 7 having means located between said walls and defining a second conduit extending from top of said container into said lower compartment.

9. A coffee-making device according to claim 8 wherein said second conduit forms an extension of said first conduit.

10. A coffee-making device according to claim 7 having a seal between said walls whereby parts of said walls define said conduit.

11. A coffee-making device according to claim 7 wherein a pattern of seals between said walls defines said filter means.

12. A coffee-making device according to claim 7 wherein a pattern of seams between said walls defines said filter means.

13. A coffee-making device comprising a sealed container divided into an upper compartment and a lower compartment and having walls of flexible heat-resisting material; a quantity of ground coffee contained in said upper compartment, the lower compartment being capable of holding a quantity of liquid; means located between said walls for defining a conduit extending from a lower part of said lower compartment into said upper compartment so that heated water can pass from said lower compartment to said upper compartment; and filter means located between said walls for interconnecting said compartments whereby liquid coffee is filtered on flowing from said upper compartment to said lower compartment.

14. Coffee making equipment comprising a strip of sealed packs, each of said packs having walls of flexible heat-resisting material and including means located between said walls dividing the interior of each pack into an upper compartment and a lower compartment; a quantity of ground coffee contained in said upper compartment, the lower compartment being capable of holding a quantity of liquid; means located between said walls for defining a conduit extending from a lower part of said lower compartment into said upper compartment so that heated water can pass from said lower compartment to said upper compartment; and filter means located between said walls for interconnecting said compartments whereby liquid coffee is filtered on flowing from said upper compartment to said lower compartment.

15. Coffee making equipment comprising a strip of packs, each of said packs having walls of flexible heat-resisting material and including means located between said walls dividing the interior of each pack into an upper compartment capable of holding a quantity of ground coffee and a lower compartment capable of holding a quantity of liquid; means located between said walls for defining a conduit extending from a lower part of said lower compartment into said upper compartment so that heated water can pass from said lower compartment to said upper compartment; and filter means located between said walls for interconnecting said compartments whereby liquid coffee is filtered on flowing from said upper compartment to said lower compartment.

References Cited

UNITED STATES PATENTS

| | | | |
|---|---|---|---|
| 1,456,010 | 5/1923 | Richheimer. | |
| 2,968,560 | 1/1961 | Goros | 99—77.1 |
| 3,119,694 | 1/1964 | Gauld | 99—77.1 |
| 3,293,048 | 12/1966 | Kitterman | 99—171 |
| 3,224,586 | 12/1965 | Wade | 210—282 |
| 3,208,854 | 9/1965 | Hediger et al. | 99—77.1 |

WILLIAM I. PRICE, *Primary Examiner.*

RAYMOND N. JONES, *Examiner.*